United States Patent
Li et al.

(10) Patent No.: US 9,740,351 B2
(45) Date of Patent: Aug. 22, 2017

(54) MULTI-STEP INCREMENTAL SWITCHING SCHEME

(71) Applicant: SYNAPTICS INCORPORATED, San Jose, CA (US)

(72) Inventors: Zheming Li, San Jose, CA (US); Saikrishna Ganta, San Jose, CA (US); Tae-Song Chung, San Jose, CA (US); Rafael Betancourt, Santa Clara, CA (US); John Michael Weinerth, San Jose, CA (US); Farzaneh Shahrokhi, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 56 days.

(21) Appl. No.: 14/870,243

(22) Filed: Sep. 30, 2015

(65) Prior Publication Data

US 2016/0334902 A1    Nov. 17, 2016

Related U.S. Application Data

(60) Provisional application No. 62/162,418, filed on May 15, 2015.

(51) Int. Cl.
*G09G 5/00* (2006.01)
*G06F 3/044* (2006.01)
*G06F 3/01* (2006.01)
*G06F 3/041* (2006.01)

(52) U.S. Cl.
CPC .............. *G06F 3/044* (2013.01); *G06F 3/016* (2013.01); *G06F 3/0416* (2013.01); *G06F 2203/04108* (2013.01)

(58) Field of Classification Search
CPC ........ G06F 3/044; G06F 3/016; G06F 3/0416; G06F 2203/04108
USPC ......................................... 345/174; 178/18.06
See application file for complete search history.

(56) References Cited

U.S. PATENT DOCUMENTS

| | | | |
|---|---|---|---|
| 4,862,136 | A | 8/1989 | Birkner |
| 5,117,206 | A | 5/1992 | Imamura |
| 6,958,661 | B2 | 10/2005 | Thompson et al. |
| 7,300,807 | B2 | 11/2007 | Coolbaugh et al. |
| 7,411,774 | B2 | 8/2008 | Leeper, II |
| 7,566,946 | B2 | 7/2009 | Coolbaugh et al. |
| 8,183,959 | B2 | 5/2012 | Katta |
| 8,288,965 | B1 | 10/2012 | Gordin |
| 8,559,207 | B2 | 10/2013 | Kim et al. |
| 2011/0310054 | A1* | 12/2011 | Souchkov ............... G06F 3/044 345/174 |

FOREIGN PATENT DOCUMENTS

| | | | |
|---|---|---|---|
| WO | 2013154797 | A1 | 10/2013 |
| WO | 2014129317 | A1 | 8/2014 |

* cited by examiner

*Primary Examiner* — Jennifer Nguyen
(74) *Attorney, Agent, or Firm* — Patterson + Sheridan, LLP (57) ABSTRACT

A capacitance measurement circuit cancels background capacitance while reducing charge leakage and supply ripples during reset phases and integrate phases. The capacitance measurement circuit operates a first switch into a linear mode causing a first resistance in the first switch, and after a delay, operates a second switch into a saturation mode causing a second resistance in parallel to the first resistance.

20 Claims, 8 Drawing Sheets

INTEGRATE PHASE

RESET PHASE

FIG. 3A

INTEGRATE PHASE

MULTI-STEP INCREMENTAL SWITCHING SCHEME

CROSS-REFERENCE TO RELATED APPLICATIONS

This application claims benefit of U.S. Provisional Patent Application No. 62/162,418, filed May 15, 2015, entitled "Multi-Step Charger Sharing Technique for Global Coarse Baseline Correction" which is incorporated by reference herein.

BACKGROUND

Field of the Disclosure

Embodiments generally relate to input sensing and, in particular, to capacitance sensing.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

Embodiments of the present disclosure provide a processing system for a capacitive sensing device. The processing system includes a capacitance measurement circuit configured to be coupled to a sensor electrode for measuring capacitance from the sensor electrode. The capacitance measurement circuit includes a differential amplifier having a first input coupled to the sensor electrode, a second input, and an output, and a feedback capacitor coupled between the first input of the differential amplifier and the output of the differential amplifier. The capacitance measurement circuit further includes a first switch and a second switch coupled between the feedback capacitor and the output of the differential amplifier in series. The capacitance measurement circuit includes a control module configured to turn on the first switch and apply a first resistance value in series with the feedback capacitor. The control module is further configured to, after a time delay, turn on the second switch and placing a second resistance in parallel with the first resistance, which lowers a total resistance in series with the feedback capacitor Another embodiment of the present disclosure provides a processing system for a capacitive sensing device. The processing system includes a capacitance measurement circuit configured to be coupled to a sensor electrode for measuring capacitance from the sensor electrode. The capacitance measurement circuit includes a differential amplifier having a first input coupled to the sensor electrode, a second input, and an output. The capacitance measurement circuit includes a first feedback capacitance coupled between the first input of the differential amplifier and the output of the differential amplifier, and a second feedback capacitance coupled in parallel to the first feedback capacitance. The second feedback capacitance includes a plurality of capacitors in series with a plurality of associated switches. The capacitance measurement circuit further includes a control module configured to, during an integrate phase, control each switch of the plurality of switches to couple the associated capacitor to the output of the differential amplifier after a sequential delay.

In another embodiment of the present disclosure, a method of capacitance measurement is provided. The method includes resetting a feedback capacitor of a capacitance measurement circuit to a first voltage level, and opening a plurality of switches between the feedback capacitor and the output of the differential amplifier. The feedback capacitor is coupled between the first input of a differential amplifier and an output of the differential amplifier. The method further includes coupling a sensor electrode and the first input of the differential amplifier to initiate a measurement phase, and closing a first switch of the plurality of switches between the feedback capacitor and the output of the differential amplifier. The method includes closing a remainder of the plurality of switches after a delay from closing the first switch, and operating the differential amplifier to integrate charge on the sensor electrode, such that an absolute capacitance corresponding to a coupling between the sensor electrode and an input object is measured.

BRIEF DESCRIPTION OF THE DRAWINGS

So that the manner in which the above recited features of embodiments can be understood in detail, a more particular description of embodiments, briefly summarized above, may be had by reference to embodiments, some of which are illustrated in the appended drawings. It is to be noted, however, that the appended drawings illustrate only typical embodiments and are therefore not to be considered limiting of scope, for other effective embodiments may be admitted.

To facilitate understanding, identical reference numerals have been used, where possible, to designate identical elements that are common to the figures. It is contemplated that elements of one embodiment may be beneficially incorporated in other embodiments.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Figure 1:
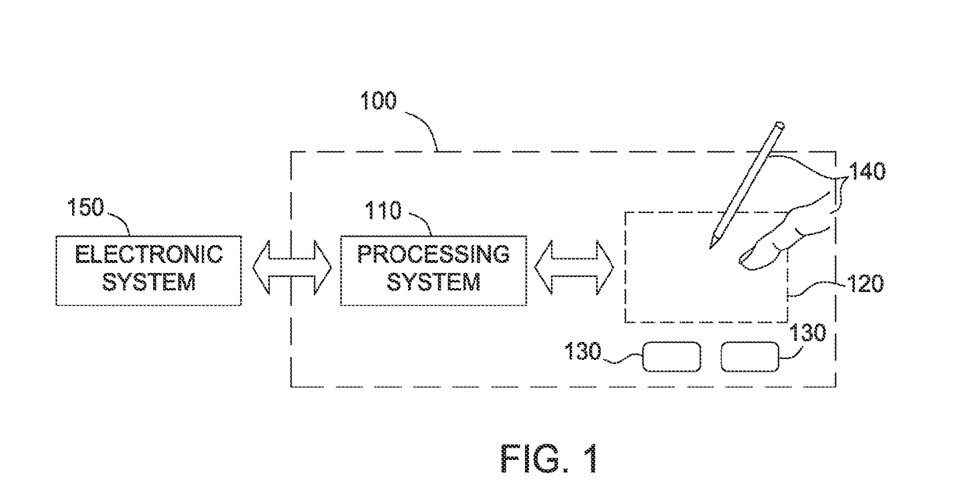
FIG. 1 is a block diagram of a system that includes an input device according to an example.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
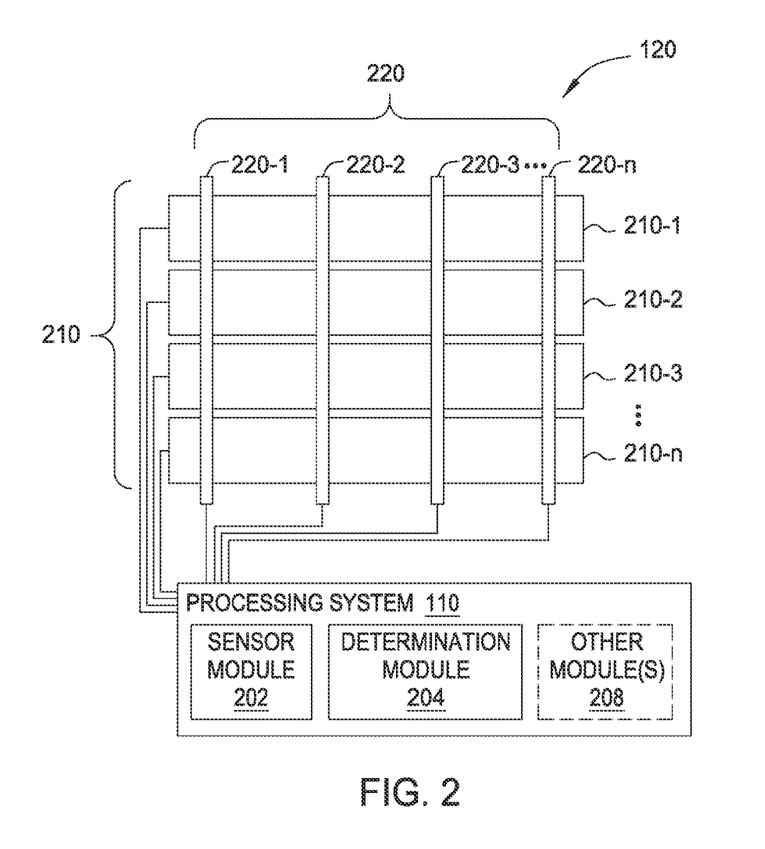
FIG. 2 is a block diagram depicting a capacitive sensor device according to an embodiment of the present disclosure.

FIG. 2 shows one embodiment of the input device 100 with a portion of an example sensor electrode pattern configured to sense in the sensing region 120 associated with the pattern, according to some embodiments. For clarity of illustration and description, FIG. 2 depicts a sensor pattern as a plurality of simple rectangles, though it is understood that the array may have other geometric forms and/or various components not shown. This sensor electrode pattern comprises a first plurality of sensor electrodes 210 (210-1, 210-2, 210-3, . . . 210-n), and a second plurality of sensor electrodes 220 (220-1, 220-2, 220-3, . . . 220-n) disposed over the first plurality of sensor electrodes 210.

The sensor electrodes 210, 220 are typically ohmically isolated from one another. Additionally, where a sensor electrode 210 includes multiple sub-electrodes, the sub-electrodes may be ohmically isolated from each other. In one embodiment, all of the sensor electrodes 210 can be disposed on a single layer of a substrate. While the sensor electrodes are shown disposed on a single substrate, in some embodiments, the sensor electrodes can be disposed on more than one substrate. For example, some sensor electrodes can be disposed on a first substrate, and other sensor electrodes can be disposed on a second substrate adhered to the first substrate.

In general, the processing system 110 excites or drives sensing elements of the sensor electrode pattern with a sensing signal and measures an induced or resulting signal that includes the sensing signal and effects of input in the sensing region 120. The terms "excite" and "drive" as used herein encompasses controlling some electrical aspect of the driven element. For example, it is possible to drive current through a wire, drive charge into a conductor, drive a substantially constant or varying voltage waveform onto an electrode, etc. A sensing signal can be constant, substantially constant, or varying over time, and generally includes a shape, frequency, amplitude, and phase. A sensing signal can be referred to as an "active signal" as opposed to a "passive signal," such as a ground signal or other reference signal. A sensing signal can also be referred to as a "transmitter signal" when used in transcapacitive sensing, or an "absolute sensing signal" or "modulated signal" when used in absolute sensing.

In an example, the processing system 110 drives sensing element(s) of the sensor electrode pattern with a voltage and senses resulting respective charge on sensing element(s). That is, the sensing signal is a voltage signal and the resulting signal is a charge signal (e.g., a signal indicative of accumulated charge, such as an integrated current signal). Capacitance is proportional to applied voltage and inversely proportional to accumulated charge. The processing system 110 can determine measurement(s) of capacitance from the sensed charge. In another example, the processing system 110 drives sensing element(s) of the sensor electrode pattern with charge and senses resulting respective voltage on sensing element(s). That is, the sensing signal is a signal to cause accumulation of charge (e.g., current signal) and the resulting signal is a voltage signal. The processing system 110 can determine measurement(s) of capacitance from the sensed voltage. In general, the term "sensing signal" is meant to encompass both driving voltage to sense charge and driving charge to sense voltage, as well as any other type of signal that can be used to obtain indicia of capacitance. "Indicia of capacitance" include measurements of charge, current, voltage, and the like, from which capacitance can be derived.

The processing system 110 can include a sensor module 202 and a determination module 204. The sensor module 202 and the determination module 204 comprise modules that perform different functions of the processing system 110. In other examples, different configurations of one or more other modules 206 can perform the functions described herein. The sensor module 202 and the determination module 204 can include circuitry and can also include firmware, software, or a combination thereof operating in cooperation with the circuitry.

The sensor module 202 selectively drives sensing signal(s) on one or more sensing elements of the sensor electrode pattern over one or more cycles ("excitation cycles") in accordance with one or more schemes ("excitation schemes"). During each excitation cycle, the sensor module 202 can selectively sense resulting signal(s) from one or more sensing elements of the sensor electrode pattern. Each excitation cycle has an associated time period during which sensing signals are driven and resulting signals measured.

In one type of excitation scheme, the sensor module 202 can selectively drive sensing elements of the sensor electrode pattern for absolute capacitive sensing. In absolute capacitive sensing, the sensor module 202 can measure voltage, charge, or current on sensor electrode(s) 210, 220 to obtain resulting signals indicative of a capacitance between the sensor electrode(s) 210, 220 and an input object. In such an excitation scheme, measurements of absolute capacitance between the selected sensing element(s) and input object(s) are determined from the resulting signal(s).

In another type of excitation scheme, the sensor module 202 can selectively drive sensing elements of the sensor electrode pattern for transcapacitive sensing. In transcapacitive sensing, the sensor module 202 drives selected transmitter sensor electrodes with transmitter signal(s) and senses resulting signals from selected receiver sensor electrodes. In such an excitation scheme, measurements of transcapacitance between transmitter and receiver electrodes are determined from the resulting signals. In an example, the sensor module 202 can drive selected sensor electrodes 210 with transmitter signal(s), and receive resulting signals from the sensor electrodes 220.

In any excitation cycle, the sensor module 202 can drive sensing elements of the sensor electrode pattern with other signals, including reference signals and guard signals. That is, those sensing elements of the sensor electrode pattern that are not driven with a sensing signal, or sensed to receive resulting signals, can be driven with a reference signal, a guard signal, or left floating (i.e., not driven with any signal). A reference signal can be a ground signal (e.g., system ground) or any other constant or substantially constant voltage signal. A guard signal can be a signal that is similar or the same in at least one of shape, amplitude, frequency, or phase of a transmitter signal.

"System ground" may indicate a common voltage shared by system components. For example, a capacitive sensing system of a mobile phone can, at times, be referenced to a system ground provided by the phone's power source (e.g., a charger or battery). The system ground may not be fixed relative to earth or any other reference. For example, a mobile phone on a table usually has a floating system ground. A mobile phone being held by a person who is strongly coupled to earth ground through free space may be grounded relative to the person, but the person-ground may be varying relative to earth ground. In many systems, the system ground is connected to, or provided by, the largest area electrode in the system. The capacitive sensor device 200 can be located proximate to such a system ground electrode (e.g., located above a ground plane or backplane).

The determination module 204 performs capacitance measurements based on resulting signals obtained by the sensor module 202. The capacitance measurements can include changes in capacitive couplings between elements (also referred to as "changes in capacitance"). For example, the determination module 204 can determine baseline measurements of capacitive couplings between elements without the presence of input object(s). The determination module 204 can then combine the baseline measurements of capacitive couplings with measurements of capacitive couplings in the presence of input object(s) to determine changes in capacitive couplings.

In an example, the determination module 204 can perform a plurality of capacitance measurements associated with specific portions of the sensing region 120 as "capacitive pixels" to create a "capacitive image" or "capacitive frame." A capacitive pixel of a capacitive image represents a location within the sensing region 120 in which a capacitive coupling can be measured using sensing elements of the sensor electrode pattern. For example, a capacitive pixel can correspond to a transcapacitive coupling between a sensor electrode 210-1 and another sensor electrode 220-1 affected by input object(s). In another example, a capacitive pixel can correspond to an absolute capacitance of a sensor electrode 210 or 220. The determination module 204 can determine an array of capacitive coupling changes using the resulting signals obtained by the sensor module 202 to produce an x-by-y array of capacitive pixels that form a capacitive image. The capacitive image can be obtained using transcapacitive sensing (e.g., transcapacitive image), or obtained using absolute capacitive sensing (e.g., absolute capacitive image). In this manner, the processing system 110 can capture a capacitive image that is a snapshot of the response measured in relation to input object(s) in the sensing region 120. A given capacitive image can include all of the capacitive pixels in the sensing region, or only a subset of the capacitive pixels.

In another example, the determination module 204 can perform a plurality of capacitance measurements associated with a particular axis of the sensing region 120 to create a "capacitive profile" along that axis. For example, the determination module 204 can determine an array of absolute capacitive coupling changes along an axis defined by the sensor electrodes 210-N and/or the sensor electrodes 220-N to produce capacitive profile(s). The array of capacitive coupling changes can include a number of points less than or equal to the number of sensor electrodes along the given axis.

Measurement(s) of capacitance by the processing system 110, such as capacitive image(s) or capacitive profile(s), enable the sensing of contact, hovering, or other user input with respect to the formed sensing regions by the sensor electrode pattern. The determination module 204 can utilize the measurements of capacitance to determine positional information with respect to a user input relative to the sensing regions formed by the sensor electrode pattern. The determination module 204 can additionally or alternatively use such measurement(s) to determine input object size and/or input object type.

In one or more embodiments, the processing system 110 may be configured to operate the capacitive sensor device to perform a type of proximity sensing sometimes referred as "hover" sensing (in contrast to sensing by actual touch). However, to achieve acceptable performance in hover sensing, the processing system 110 is configured to be able to obtain small, incremental background capacitance measurements. To amplify signals processed by the processing system 110, the processing system gains up the signals before performing analog-to-digital conversion. However, the pre-conversion signals may have a large range depending on the proximity of input object (e.g., finger) and on the amount of background capacitance. As such, the processing system 110 is configured to perform background capacitance cancellation to prevent saturation of internal stages within the processing system 110.

One effective method is to use feedback capacitance in an integrator's feedback to effectuate background capacitance cancellation. As described in greater detail later, the sensor module 202 charges the feedback capacitors during the reset phase to a reference voltage and such charge effectively cancels the background capacitance. However, this technique introduces large charge leakage into the integrator because the input node of the integrators goes above and below supply rails. Also, the sudden discharge of capacitance can cause "supply ripples" and power supply rejection (PSR) issues, particularly in single-ended systems. Accordingly, embodiments of the present disclosure provide various systems and switching schemes for resolving the above-described problems.

Another method for cancelling background capacitance is to add an opposite polarity charge on the background capacitance. As further described later, the sensor module 202 includes a capacitor whose one end is coupled to $C_B$ (i.e., capacitance to ground) and the other end is excited by a voltage signal having an opposite polarity. To reduce the physical size of such a described capacitor, the sensor module 202 can output the charge into a current conveyor followed by a current amplifier whose output is connected to $C_B$. Nonetheless, the physical size of the capacitor used by the described method may pose severe restrictions on bandwidth and performance of the current amplifier. Accordingly, embodiments of the present disclosure provide a multi-step charge shaping technique to be used for background capacitance, which further reduces the specification imposed on the current amplifier.

Figure 3A:
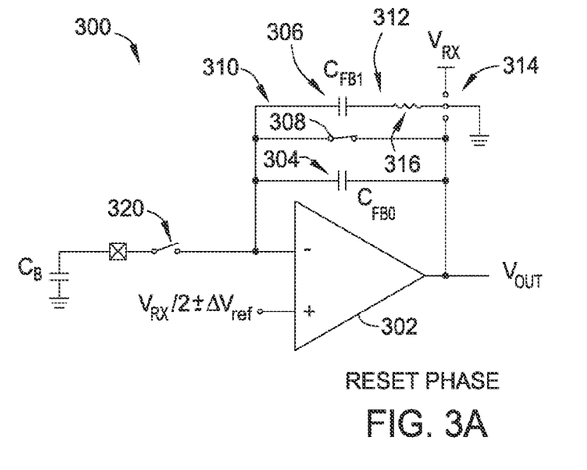
FIGS. 3A-3B illustrate operation of a capacitance measurement circuit through a cycle of absolute capacitive sensing, including a reset phase and an integration phase, according to an embodiment of the present disclosure.
Figure 3B:
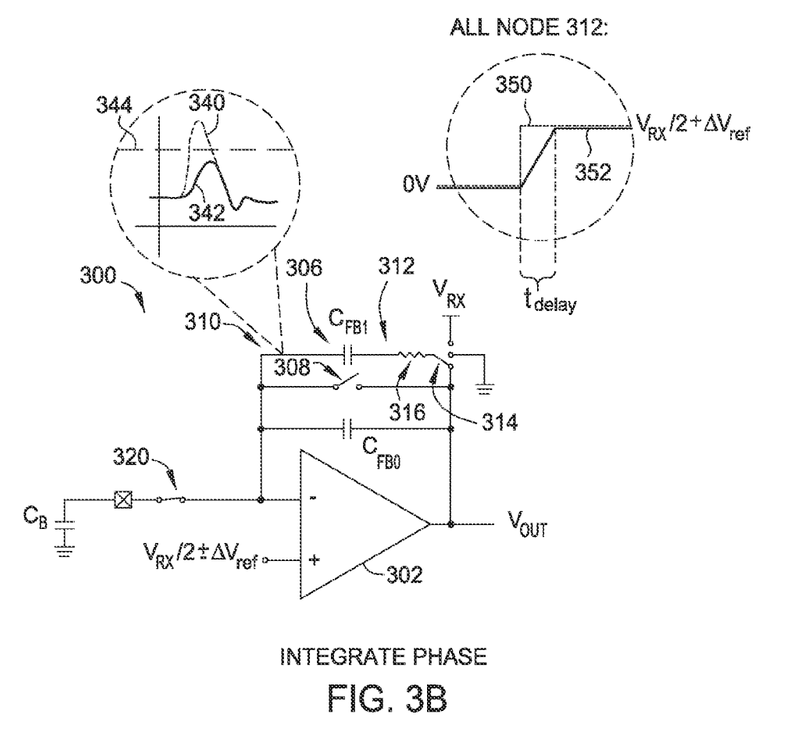

FIGS. 3A-3B illustrate operation of a capacitance measurement circuit 300 through a cycle of absolute capacitive sensing, including a reset phase (FIG. 3A) and an integration phase (FIG. 3B), according to an embodiment. The capacitance measurement circuit 300 may be included as part of an input device 100 and/or the processing system 110. For example, the processing system 110 may supply input voltages for the circuit 300 as well as control signals which operate switches in the circuit 300 and/or select capacitors from a bank of selectable capacitors. In one embodiment, the capacitance measurement circuit 300 includes a differential amplifier 302 with inverting and non-inverting inputs and an output ($V_{OUT}$). A first switch 320 is coupled between the non-inverting input of the differential amplifier 302 and a sensor electrode, such as sensor electrodes 210, 220 described above with respect to FIG. 2, to which circuit 300 is coupled.

The differential amplifier 302 is configured as a charge integrator and includes a feedback capacitance ($C_{FB}$) disposed between the output and the inverting input. The feedback capacitance is represented by one or more capacitors that are coupled on one side (e.g., a node 312) to the output of the differential amplifier 302 and coupled on the other side (e.g., a node 310) to the inverting input of the differential amplifier 302. In the depicted embodiment, the feedback capacitance $C_{FB}$ is split into multiple feedback capacitors, e.g., a first feedback capacitor 304 ($C_{FB0}$) and a second feedback capacitor 306 ($C_{FB1}$), such that one capacitor 304 can be reset while the other capacitor 306 is pre-charged to either a reference voltage $V_{RX}$ or ground during a pre-charge/reset phase of a sensing cycle. This pre-charge of the feedback capacitor works to cancel background capacitance as mentioned above. The selection of whether the feedback capacitor 306 is pre-charged to the reference voltage or ground is accomplished by the position of a switch 314 during the pre-charge/reset phase of a sensing cycle.

A switch 308 is disposed in parallel to the feedback capacitors 304, 306. The switch 308 operates as a reset mechanism to discharge and reset the feedback capacitors 304, 306. In FIGS. 3A and 3B, capacitance $C_B$ represents a background capacitance, which may include capacitance contributed to by an input object 140, between a sensor electrode and ground.

In operation, the capacitance measurement circuit 300 performs an absolute sensing method having the differential amplifier 302 is set up as a charge integrator and a reference voltage is applied to the non-inverting input of the differential amplifier 302. In one embodiment, the reference voltage is modulated by substantially equal amounts above and below a reference voltage (i.e., $\Delta V_{REF}$), which in some embodiments is approximately on half of a supply voltage $V_{RX}$. As such, the voltage applied to the non-inverting input is depicted as a first voltage ($V_{RX}/2+\Delta V_{REF}$).

During a reset phase of a (first half) sensing cycle, which is depicted in FIG. 3A, the switch 320 is opened to decouple the circuit 300 from the sensor electrode, the first feedback capacitor 304 is discharged by closing the switch 308, and the second feedback capacitor 306 is pre-charged to a voltage level by operating the switch 314 to be coupled to ground. During an integrate phase of the sensing cycle, which is depicted in FIG. 3B, the feedback capacitors 304, 306 are placed in parallel by coupling switch 314 with the output $V_{OUT}$ of the differential amplifier 302 and opening the switch 308. The inverting input of the differential amplifier 302 is coupled to the background capacitance $C_B$ by closing the first switch 320.

In conventional capacitance measurement circuits, in the reset phase, the voltage level on one side of the feedback capacitor (e.g., at the node 312) is 0 V. In the integrate phase, that side of the feedback capacitor is coupled to a reference voltage ($V_{RX}/2+\Delta V_{REF}$). An insert in FIG. 3B includes a line graph 350 depicting the sudden step from 0V to $V_{RX}/2+\Delta V_{REF}$ at node 312, which causes the first node 310 to "exceed rails." Another insert in FIG. 3B includes a line graph 340 depicting the voltage level at the other side of the feedback capacitor 306 (e.g., a node 310), which exceeds the supply voltage level 144. This excess voltage causes charge leakage via reverse biased diodes and the feedback switch 308 in the capacitance measurement circuit 300 until the differential amplifier 302 reacts and brings back the first node 310 to the voltage level $V_{RX}/2+\Delta V_{REF}$. Such RC characteristics can cause a significant error in the reference voltages, i.e., the settled final output voltage of the amplifier, yielding wrong ADC results and are a non-linear function of the input capacitor $C_B$.

Accordingly, one or more embodiments of the present disclosure are configured to reduce the voltage spike occurring at the inverting input of the differential amplifier 302 of the capacitance measurement circuit 300 when transitioning from the reset phase to the integrate phase. In one embodiment, the capacitance measurement circuit 300 includes a "ramp" mechanism which delays the voltage peaking to provide the differential amplifier 302 an opportunity to correct the input node back to $V_{REF}$.

In one embodiment, the capacitance measurement circuit 300 includes a resistor 316 coupled between one side of the feedback capacitor 306 and the output $V_{OUT}$ of the differential amplifier 302. The resistor 316 is configured to create a ramp at the node 310 from 0 V to the reference voltage when moving from the reset phase to the integrate phase during a time period $T_{REACT}$, which represents a time duration sufficient to permit the differential amplifier 302 to correct the input node 310 back to the reference voltage.

Figure 4:
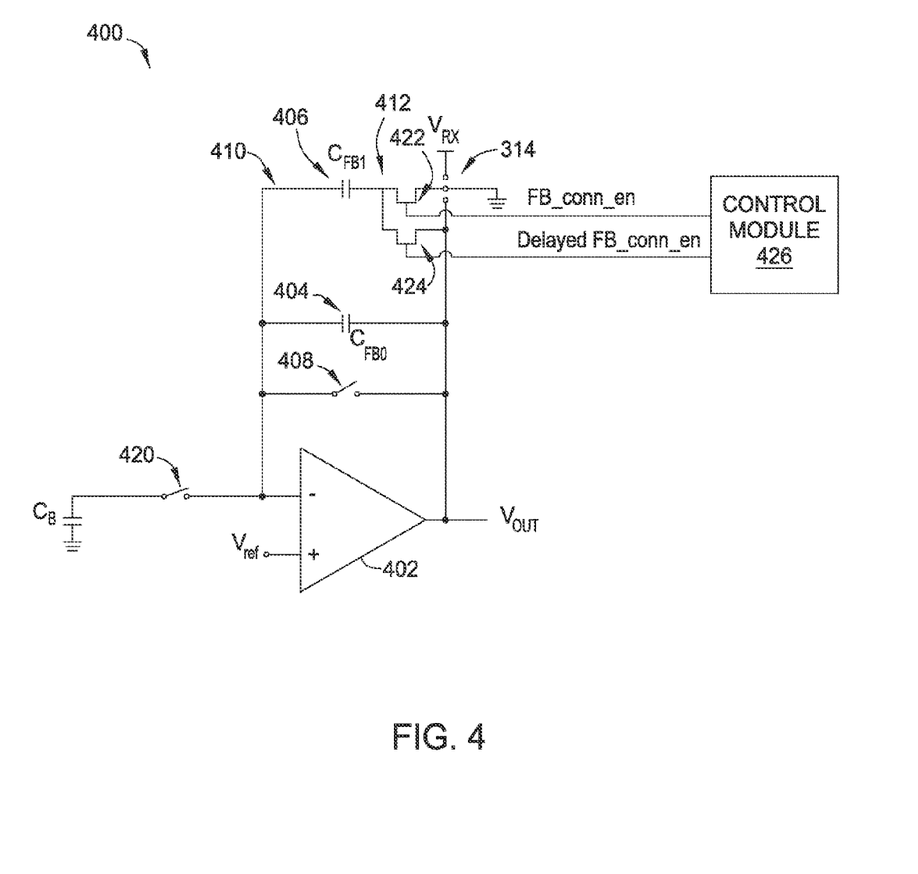
FIG. 4 is a circuit diagram of a capacitance measurement circuit configured to be coupled to a sensor electrode for measuring capacitance from the sensor electrode, according to an embodiment.

FIG. 4 is a circuit diagram of a capacitance measurement circuit 400 configured to be coupled to a sensor electrode for measuring capacitance from the sensor electrode, according to an embodiment. In some cases, the use of a fixed resistor as depicted in FIG. 4 may alter the settling response of the differential amplifier and the capacitance measurement circuit as a whole, because the resistor would always be in series to the feedback capacitor. The capacitance measurement circuit 400 is configured to address such issues. Similar to the capacitance measurement circuit 300, the circuit 400 may be included as part of an input device 100 and/or the processing system 110. For example, the processing system 110 may supply input voltages for the circuit 400 as well as control signals which operate switches in the circuit 300 and/or select capacitors from a bank of selectable capacitors.

In one embodiment, the capacitance measurement circuit 400 includes a differential amplifier 402 having an inverting input, connecting to a sensor electrode via a switch, a non-inverting input, and an output ($V_{OUT}$). A first switch 420 is coupled between the inverting input of the differential amplifier 402 and the sensor electrode, such as sensor electrodes 210, 220 described above with respect to FIG. 2, to which circuit 400 is coupled.

The differential amplifier 402 is configured as a charge integrator and includes a feedback capacitance ($C_{FB}$) coupled between the output and the inverting input of the differential amplifier. The feedback capacitance $C_{FB}$ is represented by one or more capacitors, including a first feedback capacitor 404 ($C_{FB0}$) and a second feedback capacitor 406 ($C_{FB1}$), that are coupled on one side (e.g., a node 412) to the output of the differential amplifier 402 and coupled on the other side (e.g., a node 410) to the inverting input of the differential amplifier 402. As described earlier, one capacitor 404 can be reset while the other capacitor 406 is pre-charged to either a supply voltage $V_{RX}$ or ground during a pre-charge/reset phase of a sensing cycle. This pre-charge of the feedback capacitor works to cancel background capacitance.

The selection of whether the feedback capacitor 406 is pre-charged to the supply voltage or ground is accomplished by the position of a switch (omitted for simplicity) during the pre-charge/reset phase of a sensing cycle. A switch 408 is disposed in parallel to the feedback capacitors 404, 406, which operates as a reset mechanism to discharge and reset the feedback capacitors 404, 406.

In one embodiment, the capacitance measurement circuit 400 includes a first switch 422 and a second switch 424 configured between the feedback capacitor (e.g., $C_{FB1}$) and the output $V_{OUT}$ of the differential amplifier 402 in series. In the embodiment depicted in FIG. 4, the first switch 422 and the second switch 424 are transistors, although other equivalent circuit element(s) providing the described function may be utilized. That is, the first switch 422 and the second switch 424 may include one or more circuit elements have a resistance controllably by a switch. The capacitance measurement circuit 400 is configured to receive one or more control signals from a control module 426 or other component in the processing system 110. In one embodiment, the control module 426 is configured to turn on the first switch 422, thereby applying a first resistance value in series with feedback capacitor $C_{FB1}$. The control module 426 is further configured to, after a time delay, turn on the second switch 424, placing a second resistance in parallel with the first resistance. In another embodiment, the control module 426 is configured to operate the first switch 422 into a linear mode causing a first resistance in the first switch 422. The control module 426 can, after a time delay, operate the second switch 424 into a saturation mode causing a second resistance in the parallel to the first resistance.

Figure 5:
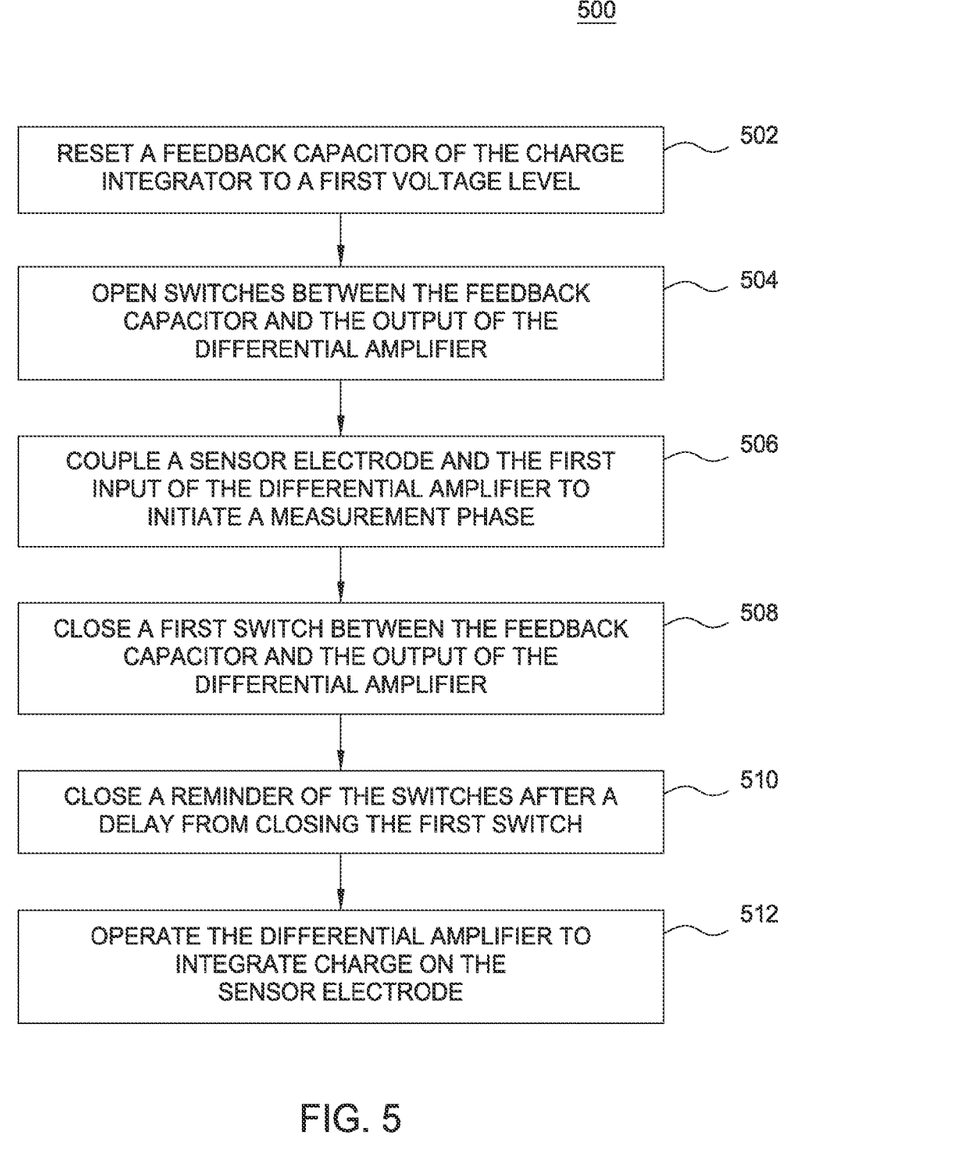
FIG. 5 is a flow diagram illustrating a method for measuring capacitance with a charge integrator, according to an embodiment.

FIG. 5 is a flow diagram illustrating a method 500 for measuring capacitance with a charge integrator, according to an embodiment. While the method 500 is described as being performed using the processing system 110 and the capacitance measurement circuits 400 described above, in addition to other similar system(s).

The method 500 begins at block 502, where the processing system 110 resets a feedback capacitor of the capacitance measurement circuit 400 to a first voltage level. In some embodiment, the feedback capacitor is coupled between the first input of a differential amplifier 402 and an output of the differential amplifier 402. In some embodiments, the processing system 110 operates a third switch (e.g., switch 314) to connect the feedback capacitor to a voltage level (e.g., ground, reference voltage, supply voltage) during the reset phase and pre-charges the feedback capacitor to cancel at least some background capacitance ($C_B$).

At block 504, the processing system 110 opens a plurality of switches between the feedback capacitor and the output of the differential amplifier 402. In one embodiment, the processing system 110 opens the switches 422, 424 coupled between the feedback capacitor 406 and the output $V_{OUT}$ of the differential amplifier 402. In some embodiments, the switch 422 and the switch 424 comprise transistors having a first, second, and third terminals, and the first terminals of the switches 422, 424 are connected in parallel, and the second terminals of the switches 422, 424 are connected in parallel. In some embodiments, the processing system 110 applies a control signal to the third terminals of the switches 422, 424 to open the switches.

At block 506, the processing system 110 couples a sensor electrode and the first input of the differential amplifier to initiate a measurement phase. In one embodiment, the processing system 110 closes the switch 420 to couple the sensor electrode 220 and the inverting input of the differential amplifier 402, and initiates the measurement phase (also referred as the integrate phase).

At block 508, the processing system 110 closes a first switch 422 of the plurality of switches between the feedback capacitor and the output of the differential amplifier. In one embodiment, the processing system 110 transmits a control signal to the first switch 422 to operate the switch 422 into a linear mode causing a first resistance for a first time duration. In some embodiments, the first resistance may be a relatively large resistance value and the switch 422 characterizing as a "weak switch."

At block 510, the processing system 110 closes a remainder of the plurality of switches after a delay from closing the first switch. The time delay (e.g., $T_{REACT}$) may be pre-selected to provide the differential amplifier 402 with sufficient time to correct the input node of the differential amplifier 402 reference voltage level. In some embodiments, the processing system 110 transmits a control signal to the second switch 424 to operate the switch 424 into a saturation mode causing a second resistance in parallel to the first resistance. In some embodiments, the processing system 110 may use separate control signals where one control signal (e.g., "fb_conn_en_strong") is delayed by one or more clock cycles compared to the other control signal (e.g., "fb_conn_en"). In one implementation, the weak switch gate (e.g., switch 422) may be controlled using a subset of bits (e.g., fb_conn_en<0:5>), whereas the strong switch (e.g., switch 424) is controlled using a signal which is a result of an "AND" function between the fb_conn_en control signal and the fb_conn_en<0:5> control signal.

In one or more embodiments, the second resistance may be substantially less than the first resistance, making the effective resistance that is in series with the capacitor 306 to be small. In this way, the second switch 424 may be characterized as a "strong switch." As mentioned above, operating the first switch 422 into the linear mode causing the first resistance in the first switch 422 may increase the settling response of the capacitance measurement circuit 400. This increase in settling response is only for a temporary amount of time because operating the second switch 424 into the saturation mode (sometimes referred to as the active mode) causing the second resistance in parallel to the first resistance may decrease the settling response of the capacitance measurement circuit, resulting in a substantially similar settling response of the capacitance measurement circuit than would exist without the switches 422, 424.

At block 512, the processing system 110 operates the differential amplifier to integrate charge on the sensor electrode, such that an absolute capacitance corresponding to a coupling between the sensor electrode and an input object is measured. It should be recognized that the differential amplifier 402 may be operated in half-cycles, such that there is a first reset phase, a first integrate phase, then a second reset phase, and a second integrate phase in a single cycle.

In another embodiment of the present disclosure, the capacitance measurement circuit may be a switched capacitor circuit that utilizes existing digital control signals, and may not require additional, separate control signals. Circuits using such switching schemes reduce charge leakage into the integrator by preventing the input node of the integrator from going above and below supply rails, and also reduce current spikes on the supply. Such circuits are described in further detail below in conjunction with FIGS. 6A-6D.

FIGS. 6A-6D illustrate operation of a capacitance measurement circuit 600 through a cycle of absolute capacitive sensing, including a reset phase (FIG. 6A) and an integration phase (FIG. 6B-6D), according to an embodiment of the present disclosure. The capacitance measurement circuit 600 may share common circuit elements and features as the capacitance measurement circuits 300, 400 describe above. The capacitance measurement circuit 600 may be included as part of an input device 100 and/or the processing system 110. For example, the processing system 110 may supply input voltages for the circuit 600 as well as control signals which operate switches in the circuit 600 and/or select capacitors from a bank of selectable capacitors.

In one embodiment, the capacitance measurement circuit 600 includes a differential amplifier 602 having a first (inverting, depicted as "−") input configured to be coupled to a sensor electrode (e.g., sensor electrodes 210, 220) for measuring capacitance from the sensor electrode. The differential amplifier 602 further includes a second (non-inverting, depicted as "+") input and an output ($V_{OUT}$). In some embodiments, a first switch 620 is disposed between the inverting input of the differential amplifier 602 and the sensor electrode.

The capacitance measurement circuit 600 further includes a first feedback capacitance 604 ($C_{FB0}$) coupled between the first input of the differential amplifier 602 and the output of the differential amplifier, and a second feedback capacitance 606 ($C_{FB1}$) coupled in parallel to the first feedback capacitance 606. The second feedback capacitance 606 may include a plurality of capacitors in series with a plurality of associated switches. A switch 608 is disposed in parallel to the feedback capacitances 604, 606. The switch 608 operates as a reset mechanism to discharge and reset the feedback capacitances 604, 606. In FIGS. 6A-6D, capacitance $C_B$ represents a background capacitance between a sensor electrode and ground.

In the embodiment depicted in FIGS. 6A-6D, feedback capacitance $C_{FB}$ is split into multiple feedback capacitors, e.g., a first feedback capacitance ($C_{FB0}$) and a second feedback capacitance 306 ($C_{FB1}$) comprised of three capacitors (Cap0, Cap1, Cap2) arranged in parallel with associated switches 610, 612, 614, respectively. The capacitance measurement circuit 600 may further include a plurality of pre-charge switches (similar to switch 314 of FIG. 3A) coupled in parallel to the plurality of switches. In such an embodiment, each pre-charge switch is operable to connect the associated capacitor to a voltage level (e.g., $V_{RX}$, ground) during a reset phase and pre-charge the associated capacitor to cancel background capacitance. For example, one capacitor 604 can be reset while the other capacitors (Cap0, Cap1, Cap2) are pre-charged to either a reference voltage $V_{RX}$ or ground during a pre-charge/reset phase of a sensing cycle. The depiction of the pre-charge switches in the circuit 600 have been omitted for clarify of illustration.

In some embodiments, the capacitance measurement circuit 600 includes a control module configured to operate the plurality of switches in reset phases and integrate phases to measure capacitance on the sensor electrode. As described in greater detail later, the control module is configured to, during an integrate phase, control each switch of the plurality of switches to couple the associated capacitor (e.g., Cap0, Cap1, Cap2) to the output ($V_{OUT}$) of the differential amplifier after a sequential delay. The sequential delay refers to changing of the state of one switch after a first delay, then changing the state of the next switch after a second delay, and so forth.

Figure 6A:
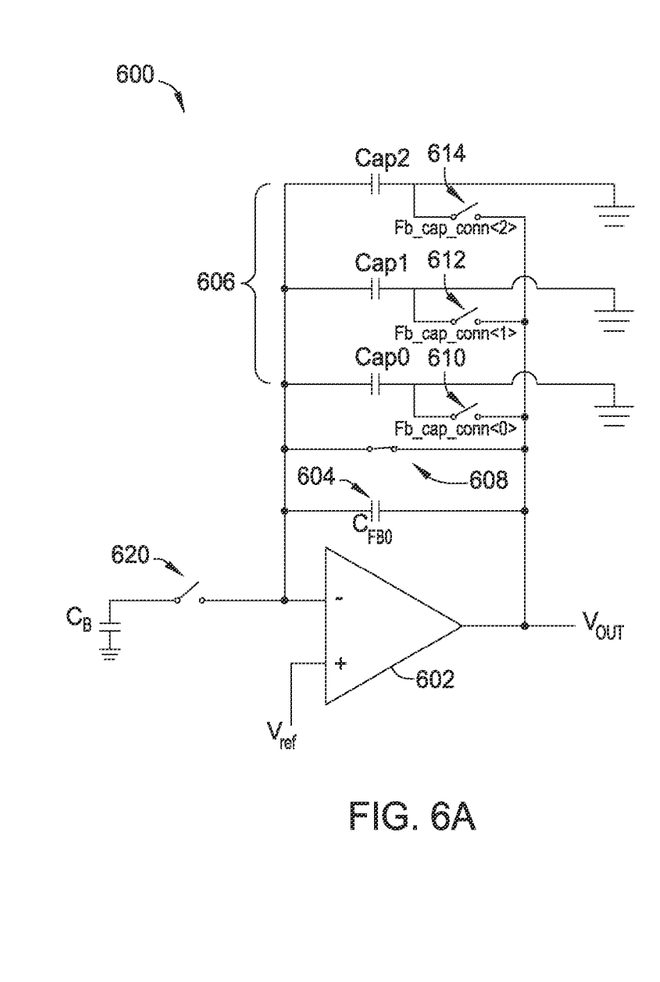
FIGS. 6A-6D illustrate operation of a capacitance measurement circuit through a cycle of absolute capacitive sensing, including a reset phase and an integration phase, according to an embodiment of the present disclosure.

FIG. 6A illustrates a reset phase of a (first half) sensing cycle. During this reset phase, the feedback capacitor (e.g., $C_{FB0}$) of the capacitance measurement circuit 600 is reset to a first voltage level. As show, the switch 620 is opened to decouple the circuit 600 from the sensor electrode, and the first feedback capacitance 604 is discharged by closing the switch 608. In some embodiments, the processing system 110 opens a plurality of switches 610, 612, 614 between the feedback capacitance (Cap0, Cap1, Cap2) and the output of the differential amplifier 602, and the plurality of capacitors Cap0, Cap1, Cap2 are pre-charged to a voltage level by operating the pre-charge switches to be coupled to ground. During operation, controlling each switch of the plurality of switches to couple the associated capacitor to the output of the differential amplifier after the sequential delay reduces charge leakage in the first feedback capacitor when switching from a reset phase to the integrate phase.

Figure 6B:
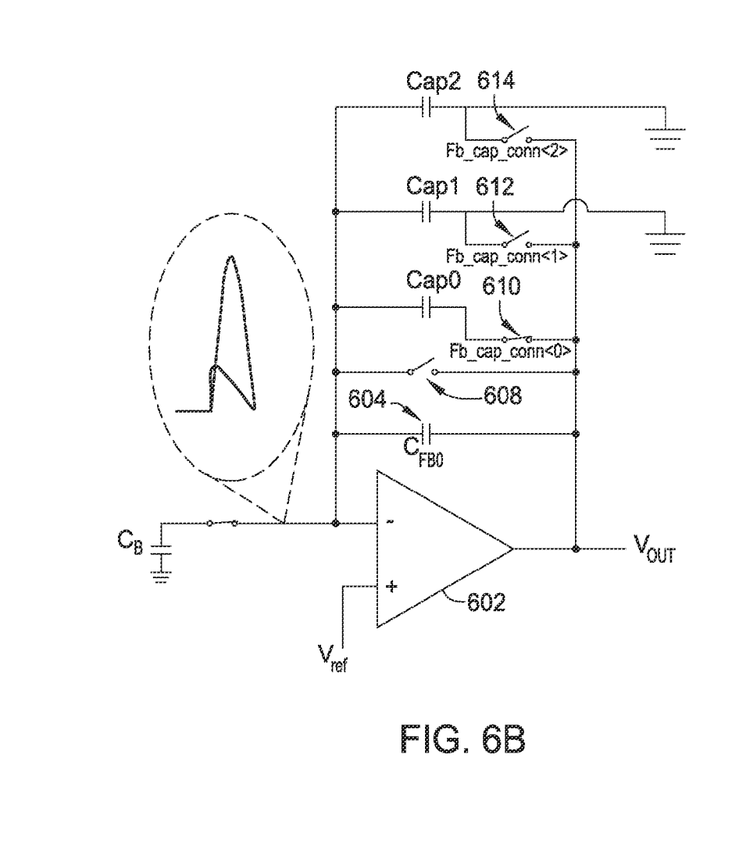
Figure 6C:
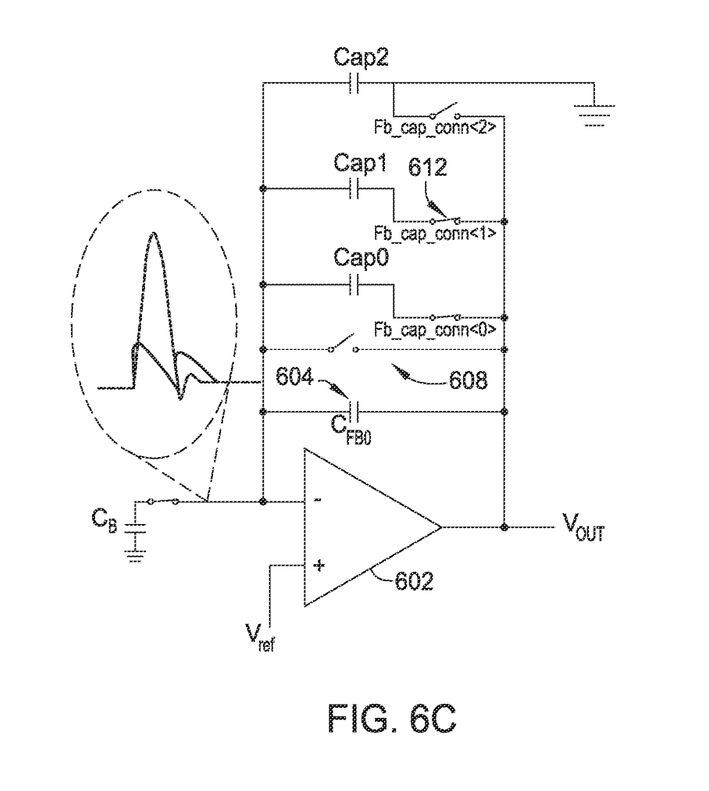
Figure 6D:
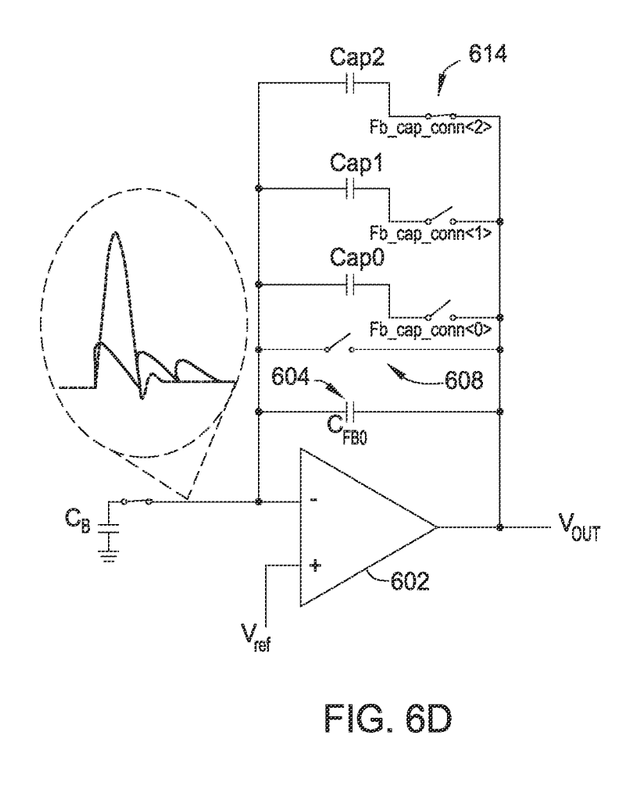

FIGS. 6B-6D illustrates the integration (measurement) phase of the (first half) sensing cycle. To initiate the measurement phase, the processing system 110 couples the sensor electrode and the first inverting input of the differential amplifier 602 by closing the switch 620. Then, the processing system 110 closes a first switch of the plurality of switches between the feedback capacitor and the output $V_{OUT}$ of the differential amplifier. As depicted in FIG. 6B, the processing system 110 closes the first switch 610 associated with a first capacitor Cap0 of the plurality of capacitors to couple the first capacitor Cap0 between the non-inverting input and the output of the differential amplifier. The processing system 110 may begin operating the differential amplifier 602 to integrate charge on the sensor electrode, such that an absolute capacitance corresponding to a coupling between the sensor electrode and an input object is measured.

If all $C_{FB1}$ capacitors are connected together at once when the integrate phase is initiated, there may be a large spike at the input node of the differential amplifier 602. This scenario is depicted by the dashed line graph found in the inset in FIG. 6B. Should the voltage level at the input node exceed the supply voltage level, charge leakage may occur. Charge may continue to leak until the charge is "leaked" below the turn-on point of diodes and switches, or until the differential amplifier 602 reacts and uses its feedback to set the input node to be equal to its positive terminal. Accordingly, not all of the feedback capacitors are connected to the output node at once at the start of the integration phase. For example, the processing system 110 closes the switch 610 (and leaves the other switches 612, 614 open) to connect the capacitor Cap0 to the output $V_{OUT}$. In some embodiments, the capacitors Cap0, Cap1, Cap2 have a total capacitance less than or substantially equal to the feedback capacitance $C_{FB0}$. Because the single capacitor Cap0 has a smaller capacitance than $C_{FB0}$, the input node of the differential amplifier 602 does not peak above supply due to charge sharing by the background capacitance $C_B$ and the first feedback capacitance $C_{FB0}$. After some delay, depending on the slew rate and the bandwidth of the differential amplifier 602, the differential amplifier 602 will eventually bring the input node back to $V_{ref}$. This behavior is depicted by the solid line graph found in the inset in FIG. 6B, which has a substantially lower voltage peak than the dashed line graph of the conventional scenario.

In one embodiment, after a delay from closing the first switch 610, the processing system 110 closes a remainder of the plurality of switches (e.g., switches 612, 614). As depicted in FIG. 6C, the processing system 110 closes the switch 612 associated with the feedback capacitor Cap1 to connect the capacitor Cap1 between the inverting input and the output node of the differential amplifier (in parallel with the capacitor Cap0 and the first feedback capacitance $C_{FB0}$). This operation may result in another peaking at the input node within the supply bounds of the differential amplifier, as depicted in the inset in FIG. 6C. Again, the differential amplifier brings the input node back to $V_{ref}$. FIG. 6D depicts another stage of the integrate phase, where the processing system closes the switch 614 associated with the feedback capacitor Cap2 to connect the capacitor Cap2 between the inverting input and the output node.

In some embodiments, the processing system 110 may determine the sequential delay between closing of switches 610, 612, 614 based on a counter. The delay may be programmable and tracked using the counter. In one embodiment, the counter can be used to control the sequencing (i.e., which switch is the first, which switch is the second, etc.) and the instance (i.e., at what time) of coupling the capacitors Cap0, Cap1, Cap2 to the output of the differential amplifier. In one example, a switching scheme may be utilized which connects Cap0 at time t=0, then connects Cap2 at time t=5 ns, and then connects Cap1 at t=12 ns. In such a switching scheme, a the processing system 110 includes a "Counter 0," which controls the switch of Cap0 (i.e., switch 610) that is programmed to count down to zero at t=0, a "Counter 1" (which controls the switch 612 associated with Cap1) that is programmed to count down to zero at t=12 ns, and a "Counter 2" (which controls the switch 615 associated with Cap2) that is programmed to count down to zero at t=5 ns.

While the present embodiment is described using three capacitors Cap0, Cap1, Cap2, it should be recognized that the described technique may be extended for N number of feedback capacitors to help reduce the current spikes at the supply.

It is further recognized that one variation of the described technique includes the division of capacitors into subsets. In an alternative embodiment, plurality of capacitors of the second feedback capacitance are arranged in subsets, and each subset is switched on at a same time during the integrate phase. In another variation of the described scheme, the processing system may select a "total" number of subsets. If the total number of subsets is M, then applying the described technique would yield M peaks at the input node of the charge integrator.

For example, in a capacitance measurement circuit 600 where the $C_{FB1}$ (comprising Cap0 and Cap1) has a total capacitance of 11 pF, and the first and second capacitors Cap0, Cap1 have a capacitance of 3.8 pF, 7.2 pF, respectively. In a first scenario, Cap0 is switched in at the start of the integration phase, and Cap1 is switched in after a programmable delay. In this first scenario, the voltage peaking graph would have a second peak that is larger than a first voltage peak, because Cap1 is a larger capacitance than Cap0. Contrast that behavior with a second scenario, in which Cap1 is switched in at the start of integration, and Cap0 is switched in after the programmable delay. In the second scenario, the first voltage peak would be larger than the second voltage peak. As such, the exact peak values may depend on a variety of factors, including the capacitance values relative to each other, in addition to $C_B$, $C_{FB0}$, and the speed of the differential amplifier.

Multi-Step Incremental Switching Techniques

Figures 7, 8:
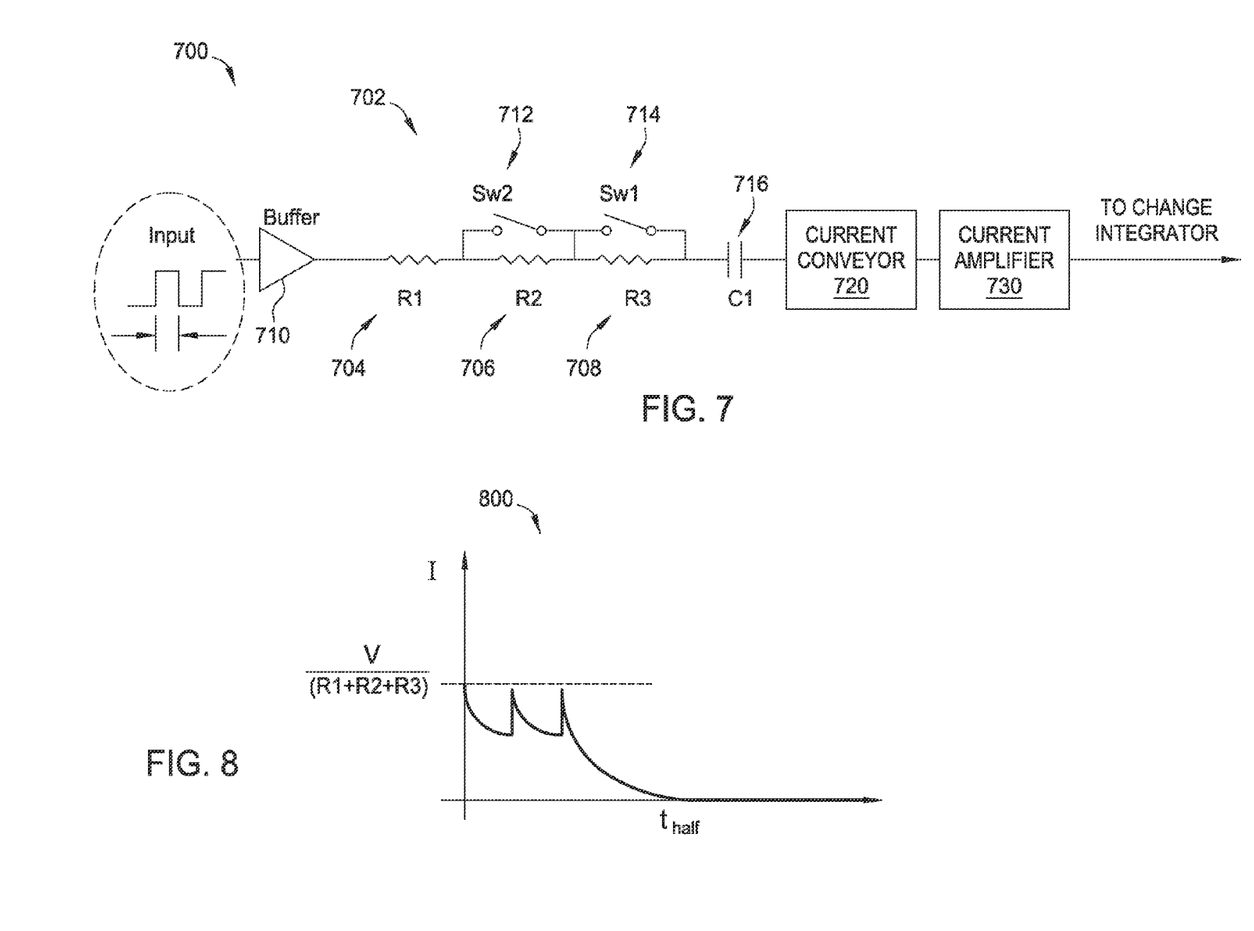
FIG. 7 is a block diagram depicting a circuit for generating a charge, according to one embodiment of the present disclosure.
FIG. 8 is a chart diagram depicting a current input waveform, according to one embodiment of the present disclosure.

As described earlier, another method for cancelling background capacitance is to add an opposite polarity charge on the background capacitance. FIG. 7 is a block diagram depicting a circuit 700 for generating a charge, according to one embodiment of the present disclosure. The circuit 700 includes a charge generation circuit 702, a current conveyor 720, and a current amplifier 730. The charge generation circuit 702 is configured to generate a charge by driving one plate of a capacitor 716 (C1) from ground to a supply voltage to ground through a first resistor 704 (R1) and a buffer 710.

The charge generated by the capacitor 716 is delivered to the current conveyor 720. The input of the current conveyor 720 may be biased to the reference voltage. The current conveyor 720 includes one or more current mirrors to distribute current to multiple current amplifiers. The current amplifier(s) 706 is configured to amplify current by amplifier gain.

In conventional approaches, the current waveform at the input of the current conveyor 720 may be a decaying exponential waveform, having a time constant set by (R1*C1). The peak current of the waveform is set by (V/R1), where V is the supply voltage. As such, the current waveform in traditional driving schemes can be represented by Equations 1 and 2 below.

$$I_{peak1} = \frac{V}{R1} \quad \text{(Equation 1)}$$

$$I(t) = I_{peak1} * e^{\frac{-t}{R1*C1}} \quad \text{(Equation 2)}$$

However, the problems of a traditional charge generation circuit are as follows. The peak current at the input of a current conveyor can easily be of mA order, and can be multiplied by the current amplifier (e.g., gain of 1 to 8). If multiple current amplifiers are working together at the same time, the summation of the peak current gets very large (hundreds of mA) and causes a large "bounce" on the internal power supply and ground line. Another problem of using the traditional waveform (which has a high amplitude and short duration) is that the waveform may not amplified accurately in the current amplifier because of the impulse nature of the waveform. The sharp waveform drives transistors to stay out of the saturation region and causes head room problems in the current conveyor. The result is that the output waveform may be distorted and causes an accuracy problem when the current is integrated by the charge integrator.

Accordingly, embodiments of the present disclosure provide a multi-step charge sharing technique that addresses such issues. The charge generation circuit 702 includes a second resistor 706 (R2), a third resistor 708 (R3), a switch 712 (SW2) and a switch 714 (SW1) arranged between the first resistor 704 and the capacitor 716. In the embodiment shown in FIG. 7, the second resistor 706 (R2) and the third resistor 708 (R3) are arranged in series with the first resistor 704. The switch 712 (SW2) is arranged in parallel to the second resistor 706 and the other switch 714 (SW1) is arranged in parallel to the third resistor 708.

In operation, at the beginning of charge generation, the switches 712 and 714 are opened and the peak current at the input of the current conveyor 720 can be represented by Equation 3 below. In some embodiments, the $I_{peak2}$ represented in Equation 3 is smaller than $I_{peak1}$ from Equation 1.

$$I_{peak2} = \frac{V}{(R1 + R2 + R3)} \quad \text{(Equation 3)}$$

In one or more embodiments, the processing system 110 may close the switches 712 and 714 sequentially with a time interval within a half cycle ($t_{half}$) of the input waveform (e.g., square wave) and generate a waveform 800 depicted in FIG. 8. That is, in a first step, the processing system 110 closes the switch 712 and leaves open the switch 714. Then, in a second step, the processing system 110 closes the switch 714. If the current waveform 800 is integrated from t=0 to t=$t_{half}$ the obtained results should be the same as those obtained via Equation 2.

In one or more embodiments, the described multi-step charge technique advantageously decreases the "bounce" in the supply and ground lines. The smaller "bounce" on the supply and ground line introduces less noise to the circuits which are connected to the same supply and ground lines. Secondly, due to the smaller peak amplitude ($I_{peak2}$), the accuracy can be improved when the charge is integrated by the charge integrator.

Switching Scheme for Charge Pump Circuits

Figure 9:
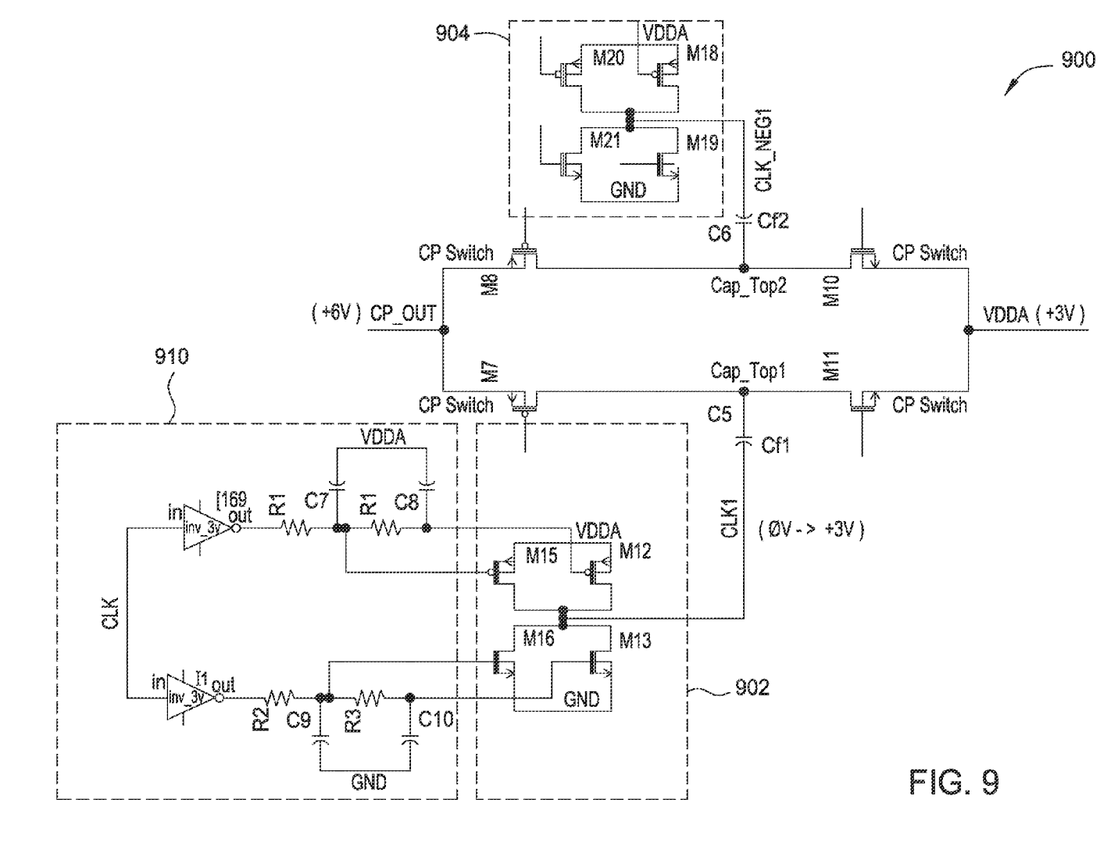
FIG. 9 is a block diagram depicting a charge pump circuit using the described switching scheme, according to one embodiment of the present disclosure.

While the switching scheme is described above in the context of a multi-step charge technique for global coarse baseline correction, it is understood that embodiments of the present disclosure can be extended for use in other types of circuits, particularly circuits that have operations which result in large swings in current and/or voltage levels. FIG. 9 depicts one such example.

FIG. 9 is a block diagram depicting a charge pump circuit 900 using the described switching scheme, according to one embodiment of the present disclosure. In the depicted charge pump circuit 900, flyback capacitors Cf1 and Cf2 are charged and discharged to provide corresponding output voltages (CP_OUT).

In prior approaches, the switches in series with the flyback capacitors are large to reduce their resistance and thus the voltage drop across them. However, when these large switches are turned ON or OFF to charge or discharge the flyback capacitors, respectively, there may be large transient peaks in charging currents flowing across the circuit 900. These high current peaks can result in high electromagnetic emission that affects neighboring sensitive circuits, integrated circuits, and/or processing systems within an input device. This issue can be especially acute in touch sensor ASICs used in mobile devices, where stringent requirements on peak emitted powers have to be met.

In one or more embodiments, instead of using conventional large switches, the charge pump circuit 900 includes a switching element comprised of multiple, weighted smaller switches (i.e., smaller relative to the single, large switch). The multiple switches are configured to turn on sequentially with a small delay within a charge pump clock cycle. In the embodiment depicted in FIG. 9, the charge pump circuit 900 includes a switching element 902 that is connected in series with the flyback capacitor Cf1 (i.e., to the bottom plate of Cf1), the switching element 902 being comprised of the multiple, weighted switches M12, M13, M15, M16. Another switching element 904 is coupled to the other flyback capacitor Cf2, and is comprised of the multiple, smaller switches M18, M19, M20, M21 according to the embodiment illustrated in FIG. 9.

In some embodiments, the delay between the smaller switches in a switching element 902 can be implemented using an RC circuit, or in other embodiments, can come from a counter. In the example depicted in FIG. 9, the charge pump circuit 900 includes a RC delay circuit 910 coupled to the gates of switches M12, M13, M15, and M16 to control the sequential delayed turning on and off of the switches. A similar RC delay circuit for the switching element 904 is omitted for simplicity of illustration.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for a capacitive sensing device, the processing system comprising:
   a capacitance measurement circuit configured to be coupled to a sensor electrode for measuring capacitance from the sensor electrode, the capacitance measurement circuit comprising:
      a differential amplifier having a first input coupled to the sensor electrode, a second input, and an output,
      a feedback capacitor coupled between the first input of the differential amplifier and the output of the differential amplifier, and
      a first switch and a second switch coupled between the feedback capacitor and the output of the differential amplifier in series; and
   a control module configured to:
      turn on the first switch and apply a first resistance in series with the feedback capacitor, and
      after a time delay, turn on the second switch and place a second resistance in parallel with the first resistance, which lowers a total resistance in series with the feedback capacitor.

2. The processing system of claim 1, wherein the first resistance in series with the feedback capacitor is greater than the second resistance.

3. The processing system of claim 1, wherein the first switch and the second switch comprise transistors having a source terminal, a drain terminal, and a gate terminal, wherein the source terminals of the first and second switches are connected in parallel, and the drain terminals of the first and second switches are connected in parallel; and
   wherein the control module is configured to apply different control signals to the gate terminals of the first and second switches.

4. The processing system of claim 1, wherein turning on the first switch and applying the first resistance in series with the feedback capacitor increases a settling response of the capacitance measurement circuit, and
   wherein turning on the second switch and placing the second resistance in parallel with the first resistance decreases the settling response of the capacitance measurement circuit.

5. The processing system of claim 1, wherein the feedback capacitor is a first feedback capacitor, and the capacitance measurement circuit further comprises a second feedback capacitor in parallel with the first feedback capacitor and a third switch.

6. The processing system of claim 1, wherein the capacitance measurement circuit further comprises a third switch operably to connect the feedback capacitor to a voltage level during a reset phase and pre-charge the feedback capacitor to cancel background capacitance.

7. The processing system of claim 1, wherein turning on the first switch and applying the first resistance in series with the feedback capacitor reduces charge leakage in the feedback capacitor when switching from a reset phase to an integrate phase.

8. A processing system for a capacitive sensing device, the processing system comprising:
   a capacitance measurement circuit configured to be coupled to a sensor electrode for measuring capacitance from the sensor electrode, the capacitance measurement circuit comprising:

a differential amplifier having a first input coupled to the sensor electrode, a second input, and an output, a first feedback capacitance coupled between the first input of the differential amplifier and the output of the differential amplifier, a second feedback capacitance coupled in parallel to the first feedback capacitance, the second feedback capacitance comprising a plurality of capacitors in series with a plurality of associated switches; and a control module configured to, during an integrate phase, control each switch of the plurality of switches to couple the associated capacitor to the output of the differential amplifier after a sequential delay, and wherein the control module is configured to turn on a first switch of the plurality of switches and apply a first resistance in series with a first capacitor of the capacitors associated with the plurality of switches, and after a time delay, turn on a second switch of the plurality of switches and place a second resistance in parallel with the first resistance.

9. The processing system of claim 8, wherein the plurality of capacitors comprising the second feedback capacitance are arranged in parallel.

10. The processing system of claim 8, wherein the control module is configured to determine the sequential delay based a counter.

11. The processing system of claim 8, wherein the control module is configured to, during the integrate phase, control each switch of the plurality of switches is further configured to:

close the first switch associated with the first capacitor of the plurality of capacitors to couple the first capacitor between the first input and the output of the differential amplifier, and close a third switch associated with a second capacitor of the plurality of capacitors to couple the second capacitor between the first input and the output of the differential amplifier and in parallel with the first capacitor and the first feedback capacitance.

12. The processing system of claim 8, wherein the plurality of capacitors of the second feedback capacitance are arranged in subsets, wherein each subset is switched on at a same time during an integrate phase.

13. The processing system of claim 8, wherein the second feedback capacitance further comprises a plurality of pre-charge switches coupled in parallel to the plurality of switches, wherein each pre-charge switch is operably to connect the associated capacitor to a voltage level during a reset phase and pre-charge the associated capacitor to cancel background capacitance.

14. The processing system of claim 8, wherein controlling each switch of the plurality of switches to couple the associated capacitor to the output of the differential amplifier after the sequential delay reduces charge leakage in the first feedback capacitance when switching from a reset phase to an integrate phase.

15. A method of capacitance measurement, the method comprising:

resetting a feedback capacitor of a capacitance measurement circuit to a first voltage level, wherein the feedback capacitor is coupled between a first input of a differential amplifier and an output of the differential amplifier;

opening a plurality of switches between the feedback capacitor and the output of the differential amplifier;

coupling a sensor electrode and the first input of the differential amplifier to initiate a measurement phase;

closing a first switch of the plurality of switches between the feedback capacitor and the output of the differential amplifier, closing the first switch apply a first resistance in series with the feedback capacitor;

after a time delay, turn on a second switch of the plurality of switches and place a second resistance in parallel with the first resistance;

closing a remainder of the plurality of switches after a delay from closing the first switch; and operating the differential amplifier to integrate charge on the sensor electrode, such that an absolute capacitance corresponding to a coupling between the sensor electrode and an input object is measured.

16. The method of claim 15, wherein resetting the feedback capacitor of the capacitance measurement circuit to the first voltage level further comprises:

operating a pre-charge switch to couple the feedback capacitor to a second voltage level and pre-charge the feedback capacitor for background capacitance cancellation.

17. The method of claim 15, wherein the first and second switches of the plurality of switches between the feedback capacitor and the output of the differential amplifier comprises:

a first transistor and a second transistor having a first, second, and third terminals, wherein the first terminals of the first and second switches are connected in parallel, and the second terminals of the first and second switches are connected in parallel, wherein the first and second transistors are configured to receive control signals on the third terminals of the first and second transistors.

18. The method of claim 15, wherein closing the first switch of the plurality of switches between the feedback capacitor and the output of the differential amplifier further comprises:

operating the first switch into a linear mode causing a first resistance in the first switch, and wherein closing the remainder of the plurality of switches after the delay from closing the first switch further comprises:

operating the second switch into a saturation mode causing a second resistance in parallel to the first resistance, wherein the first resistance is greater than the second resistance.

19. The method of claim 15, wherein the feedback capacitor comprises a plurality of feedback capacitors, wherein each of the plurality of feedback capacitors is arranged in series with an associated switch of the plurality of switches.

20. The method of claim 15, wherein each switch of the plurality of switches between the feedback capacitor and the output of the differential amplifier is configured to couple the associated feedback capacitor between the first input of the differential amplifier and the output of the differential amplifier.

* * * * *